United States Patent
Theodossy et al.

(10) Patent No.: US 6,898,768 B1
(45) Date of Patent: May 24, 2005

(54) METHOD AND SYSTEM FOR COMPONENT COMPATIBILITY VERIFICATION

(75) Inventors: Samer Theodossy, San Jose, CA (US); Prabhakara Yellai, San Jose, CA (US); Alex Truong, Santa Clara, CA (US); Robert Stebbins, Eldorado Hills, CA (US); Jan Medved, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/150,599

(22) Filed: May 17, 2002

(51) Int. Cl.⁷ .......................... G06F 17/50; G06F 9/455; G06F 13/00
(52) U.S. Cl. .............................. 716/5; 703/27; 710/104
(58) Field of Search .......................... 716/5, 1; 703/27; 710/104; 709/230

(56) References Cited

U.S. PATENT DOCUMENTS

| | | | | |
|---|---|---|---|---|
| 5,499,357 A | * | 3/1996 | Sonty et al. | 710/104 |
| 5,579,509 A | * | 11/1996 | Furtney et al. | 703/27 |
| 5,613,101 A | * | 3/1997 | Lillich | 709/230 |
| 5,835,735 A | * | 11/1998 | Mason et al. | 710/107 |
| 6,216,186 B1 | * | 4/2001 | Mayhead et al. | 710/102 |
| 2002/0124245 A1 | * | 9/2002 | Maddux et al. | 717/176 |

FOREIGN PATENT DOCUMENTS

EP   0275448 A1 *  7/1998  .......... H04Q/3/545

OTHER PUBLICATIONS

"Best Practices for Softward Migration," Express Metrix, 2000, Express Metrix LLC, Seattle, Washington.

* cited by examiner

*Primary Examiner*—A. M. Thompson
(74) *Attorney, Agent, or Firm*—Blakely, Sokoloff, Taylor & Zafman LLP

(57) ABSTRACT

Components to be verified for compatibility are identified. Each of the components maintains a relationship with the other components such that all of the components are compatible with one another. A change to one component triggers an automatic evaluation of the relationships between the changed component and the other components to determine if compatibility is maintained. The automatic evaluation of the relationships is based on predetermined compatibility information provided in a compatibility matrix. When the automatic evaluation identifies incompatibility between the changed component and the other components, the change is rejected.

18 Claims, 6 Drawing Sheets

Ungraceful Upgrades

One ASC (no redundancy)

| | To 2.x | To 3.x | To 4.x | To 5.x |
|---|---|---|---|---|
| From version 2.x | 1 | 1 | 5 | via 4.x |
| From version 3.x | - | 1 | 5 | via 4.x |
| From version 4.x | - | - | 8 | 8 |
| From version 5.x | - | - | - | 8 |

Graceful Upgrades

Two ASCs (redundant)

| | To 2.x | To 3.x | To 4.x | To 5.x |
|---|---|---|---|---|
| From version 2.x | 10 | 3* | 11 | via 4.x |
| From version 3.x | - | 10 | 11 | via 4.x |
| From version 4.x | - | - | 12 | 12 |
| From version 5.x | - | - | - | 12 |

Downgrades

One ASC (no redundancy)

| | To 2.x | To 3.x | To 4.x | To 5.x |
|---|---|---|---|---|
| From version 2.x | 2 | - | - | - |
| From version 3.x | 2 | 2 | - | - |
| From version 4.x | 6 | 6 | 9 | - |
| From version 5.x | via 4.x | via 4.x | 9 | 9 |

Downgrades

Two ASCs (redundant)

| | To 2.x | To 3.x | To 4.x | To 5.x |
|---|---|---|---|---|
| From version 2.x | 4 | - | - | - |
| From version 3.x | 4 | 4 | - | - |
| From version 4.x | 7 | 7 | 13 | - |
| From version 5.x | via 4.x | via 4.x | 13 | 13 |

FIG. 2
(PRIOR ART)

FOR PXM45

Release 2.1.1
Graceful_Upgrade        FROM        2.0.13
Graceful_Upgrade        FROM        2.1.0

Release 2.1.0
Graceful_Upgrade        FROM        2.0.12
No_Upgrade              FROM        2.0.13

Release 2.0.13
Graceful_Upgrade        FROM        2.0.12

Release 2.0.12
Graceful_Upgrade        FROM        2.0.11
Graceful_Upgrade        FROM        2.0.10

Release 2.0.11
NonGraceful_Upgrade     FROM        2.0.10

Release 2.0.10
Graceful_Upgrade        FROM        2.0.12

END

FIG. 4

METHOD AND SYSTEM FOR COMPONENT COMPATIBILITY VERIFICATION

FIELD OF THE INVENTION

The present invention relates generally to field of system maintenance and migration, more specifically directed to automatic software and/or hardware compatibility verification.

BACKGROUND

System upgrades can be a complex process requiring much planning. Typically, system upgrades are performed to replace failing hardware or to take advantages of new or enhanced features of current hardware. The new or enhanced features may come in the form of hardware, software or a combination of both hardware and software. One important requirement to be addressed in performing system upgrades is compatibility of the new hardware with the existing hardware and software in the system. Planning for system upgrades is an activity that can consume time and resources. Often documentations are meticulously prepared and followed to avoid potential negative impact on the system.

For example, in the MGX 8850 switch manufactured by Cisco Systems of San Jose, Calif., there can be up to 12 ATM Switching Modules (AXSM) and two Processor Switching Modules (PXM) on multiple slots in a single shelf. The Processor Switching Module (PXM) is referred to as the control module. Within a shelf, in addition to the control module, there are other modules referred to as service modules. Each service module generally comes in a card set that consists of a front card (with its attached daughter card) and one or two back cards (or line modules). The front card contains the processing intelligence and, on the daughter card, the firmware that distinguishes the interface (e.g., OC-48, OC-3, T3, E3, etc.). The service modules interact with each other using a shared bus. FIG. 1 is a block diagram illustrating an example of a communication module. The communication module 100 includes a control module 130 and several service modules 110–125. The control module 130 is connected with the service modules 120, 125 through a shared bus 105. The control module 130 is connected with the service modules 110, 115 through the shared bus 102. Each of the service modules 110–125 may be configured to process a type of traffic (e.g., Frame Relay, Voice, Asynchronous Transfer Mode (ATM), T1/E1, etc.). In addition to connecting with multiple shared buses 102, 105 to the multiple service modules (e.g., service modules 110–125), the control module 130 may also be connected with a high bandwidth bus 135 (e.g., OC-12, OC-3) to a core network and other core nodes (not shown). Similar to the service modules, the control modules also have front cards and back cards.

The control module and each of the service modules has an associated hardware revision. Furthermore, the control module and each of the services modules has an associated boot firmware revision and runtime firmware revision. Because each of the hardware, boot firmware and runtime firmware has a separate revision, it is important that any upgrade to the hardware revision, boot firmware revision, and runtime revisions in a module are compatible with one another. For example, there is a hardware compatibility requirement that when one module (e.g., control or processor module) is running at a particular hardware revision, each of the other modules (e.g., service modules) also has to run at an equivalent revision. In addition to the compatibility requirement on a single module, there is also a compatibility requirement across the modules. For example, there may be a software compatibility requirement such that when the control module is running with a particular software revision, each of the associated service modules also has to run with a compatible software revision.

Currently, compatibility is addressed by preparing compatibility documentations that specifically list compatibility information (e.g., in tables or matrices) to enable the end users to manually use the compatibility information and select the appropriate hardware and/or software revisions that satisfy the compatibility requirement. FIG. 2 illustrates prior art examples of an upgrade matrix and a downgrade matrix used for a Cisco MGX 8220 switch. There may be different upgrade procedures and downgrade procedures that the end users have to follow depending on the operation.

Referring to the examples in FIG. 2, to perform an ungraceful upgrade (205) from version 2.x to version 3.x, the upgrade procedure number one is to be followed. However, to perform a downgrade (210) from version 4.x to another version 4.x, the upgrade procedure number nine is to be followed, etc. Furthermore, with each upgrade procedure, the end user has to issue commands at the system to verify correct existing revision information. Each procedure may require a different number of steps that the end user has to go through. For example, the procedure number one requires 14 steps to complete, while the procedure number nine requires 13 steps. With each new release of a component, the requirement for compatibility and risk of errors increase. Although FIG. 2 includes examples that refer to the Cisco MGX 8220 switch, similar methods are used to perform upgrades and/or downgrades for other switches. Even with detailed compatibility documentation, the risk of the end users installing an incompatible hardware still exists.

Because compatibility is critical for all upgrades, downgrades and system maintenance, it is important to verify that compatibility exists for hardware revisions as well as software revisions prior to experiencing any problems relating to incompatibility. When an installed hardware component is incompatible with the rest of the system, the system may not operate optimally (e.g., disruption to network traffic, degradation of performance, etc.). Accordingly, it is advantageous to be able to perform compatibility verification without suffering from the limitations of the current method.

SUMMARY OF THE INVENTION

In one aspect of the invention, components in a system that require compatibility with one another are identified. When a component is modified, a compatibility matrix is used to automatically determine compatibility requirement of the modified component based on a current state of the system. When the compatibility requirement of the modified component is met by the current state of the system, the modified component is accepted into the system.

In another aspect of the invention, a compatibility matrix is formed to provide compatibility information for a plurality of components capable of being installed in a system. Responsive to a change to the system relating to at least one component, the system automatically compares the change with the compatibility information to determine whether to accept or reject the change.

In yet another aspect of the invention, a control module in a switch first verifies itself to determine if its associated hardware revision and one or more associated software revisions are compatible with one another based on compatibility information for the control module provided in a predetermined compatibility matrix. After the control module successfully verifies itself, the control module verifies each of one or more related service modules to determine if the control module is compatible with the one or more related service modules based on compatibility information for the control module and for the one or more related service modules provided in the predetermined compatibility matrix.

In yet another aspect of the invention, a system for verifying component compatibility is disclosed. The system includes a processor and a memory coupled with the processor, wherein the memory stores an instance of a compatibility matrix having compatibility information for one or more components in the system. In response to an event that causes a change to the system relating to the one or more components, the processor determines if the change to the system is acceptable based on the compatibility information in the compatibility matrix.

In yet another aspect of the invention, a method of forming a compatibility matrix is disclosed. The compatibility matrix includes components to be verified for compatibility. For each component, the supported revisions are identified. For each supported revision, an indication is provided relating to whether the supported revision can be migrated to another supported revision for all of the supported revisions. The compatibility matrix is automatically accessed and used to perform compatibility verification.

In yet another aspect of the invention, the components to be tested for compatibility are identified. Each of the components maintains a relationship with the other components such that all of the components are compatible with one another. A change to one component triggers an automatic reevaluation of the relationships between the changed component and the other components to determine if compatibility is maintained. The automatic reevaluation of the relationships is based on predetermined compatibility information provided in a compatibility matrix. When the automatic reevaluation identifies incompatibility between the changed component and the other components, the change is rejected.

Other features of the present invention will be apparent from the accompanying drawings and from the detailed description which follows.

BRIEF DESCRIPTION OF THE DRAWINGS

The present invention is illustrated by way of example, and not limitation, in the figures of the accompanying drawings in which:

FIG. 2 illustrates prior art examples of an upgrade matrix and a downgrade matrix used for a Cisco MGX 8220 switch.

FIG. 4 illustrates an example of a compatibility matrix in accordance with one embodiment of the present invention.

DETAILED DESCRIPTION

In one embodiment of the invention, a compatibility matrix is formed to provide compatibility information for a plurality of components in a system. Responsive to a change associated with a component in the system, the change is automatically compared with the compatibility information to determine whether to accept the change or to reject the change.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

Figure 1:
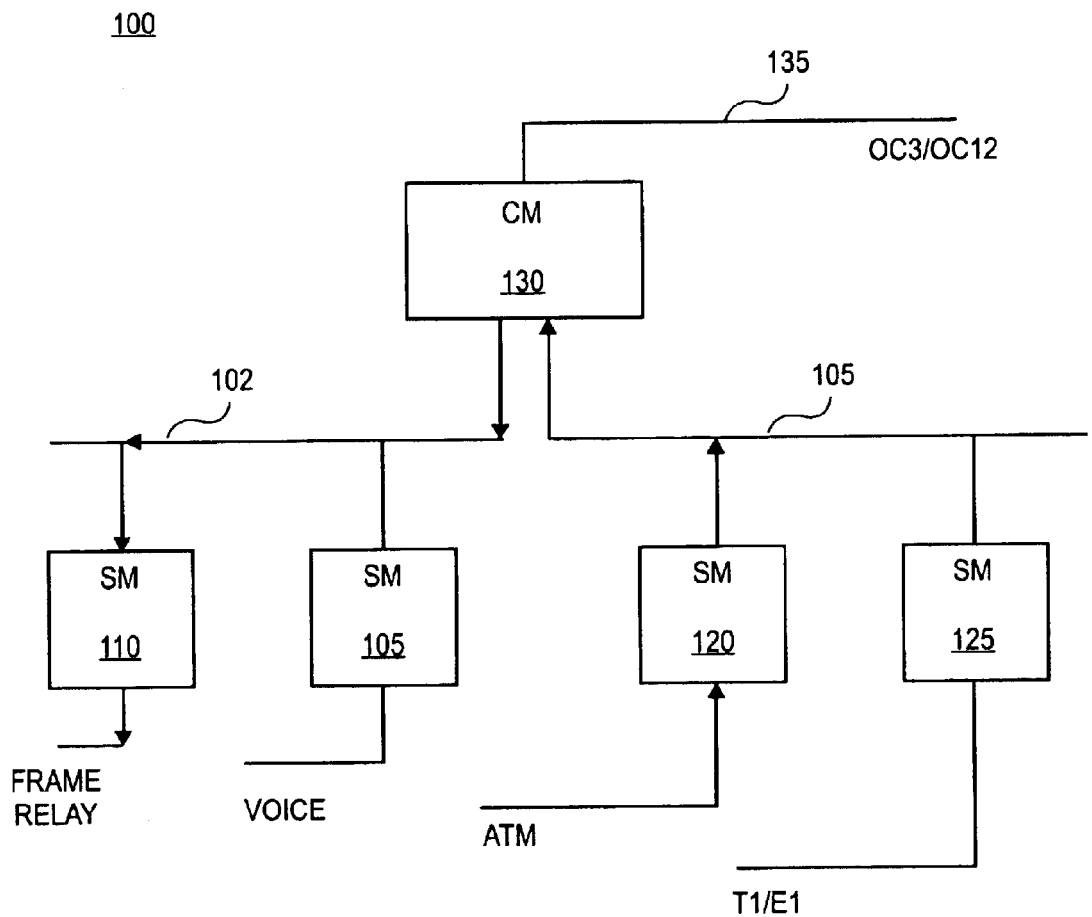
FIG. 1 is a block diagram illustrating an example of a communication module.
Figure 3:
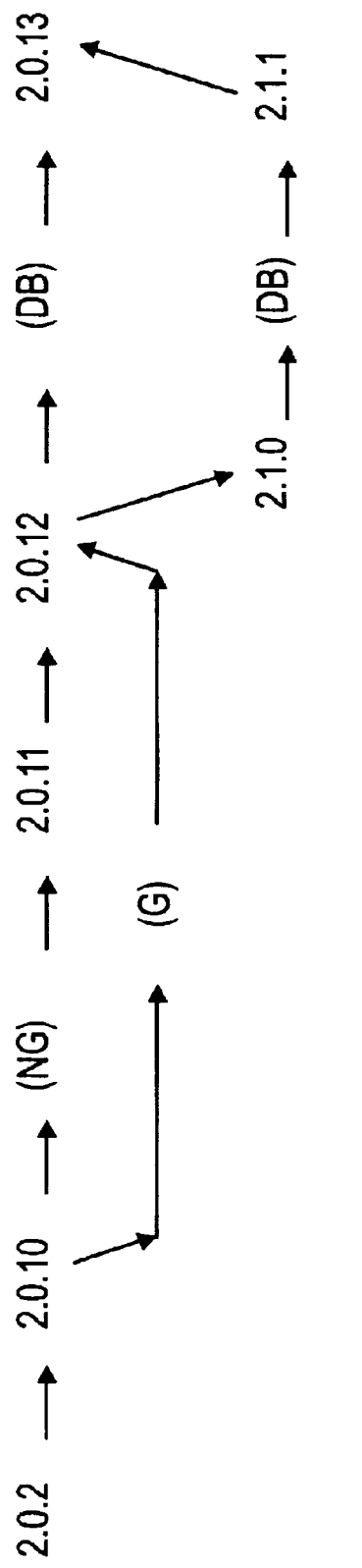
FIG. 3 is a diagram illustrating an example of a compatibility map in accordance with one embodiment of the present invention.

FIG. 3 is a diagram illustrating an example of a compatibility map in accordance with one embodiment of the present invention. The compatibility map includes attributes that are included in the compatibility text file (e.g. H/W Rev, S/W Rev, F/W rev, mem size, # of CPUs, etc.). The compatibility map also includes migration information from one revision to another revision. The migration information may be upgrade information and/or downgrade information. The migration information may include information such as, for example, whether the migration is possible (e.g., graceful or ungraceful) or not possible. A graceful migration is one in which there is negligible impact on the system. A non-graceful migration is one in which there is some impact on the system but the impact may not be enough to cause, for example, drastic performance degradation. A system is considered to be drastically impacted, for example, when it fails to operate or when it operates at an unacceptable level due to incompatibility of one or more components. When a migration is possible, the migration information may also include other requirements (e.g., database change, etc.) necessary to complete the migration.

Referring to compatibility map example in FIG. 3, a migration path from revision 2.0.10 to revision 2.0.12 is indicated as possible and graceful. A migration path from revision 2.0.10 to revision 2.0.11 is indicated as possible but non-graceful. A migration path from revision 2.0.11 to revision 2.0.12 is not possible, as is a migration path from revision 2.0.2 to revision 2.0.10, etc. Other methods of forming the compatibility map may also be used to provide the possible and/or non-possible migration information.

In one embodiment of the present invention, a language having a set of constructs is used to define the compatibility information among various revisions (hardware, software, firmware, etc.) of the multiple components in a system (e.g., a communication switch, etc.). Following is a description for each of the constructs along with its corresponding syntax or grammar:

Comment

Denotes a comment line.

Version <version number>

Denotes a version of the language. A version number may include a major version number and a minor version number in a dotted format such as, for example, maj.min.

FOR <type of component>

Denotes the component to which the matrix applies. This construct also indicates a beginning of a block.

RELEASE <revision number>

Denotes a revision number of, for example, the runtime firmware to which the matrix applies. A revision number may include a major revision number and a minor revision number in a dotted format such as, for example, maj.min. The revision number may also include other information to provide more details about the release such as, for example, a maintenance patch, a release phase, etc.

Graceful_Upgrade FROM <release number>
Denotes that upgrade from a specified release number is graceful and allowed. There may be one or more of this instruction for each release number that can be gracefully upgraded from.

Non-Graceful_Upgrade FROM <release number>
Denotes that upgrade from a specified release number is non-graceful but allowed. A non-graceful upgrade may cause some negative impact. There may be one or more of this instruction for each release number that can be non-gracefully upgraded from.

Graceful_Downgrade FROM <release number>
Denotes that downgrade from a specified release number is graceful and allowed. There may be one or more of this instruction for each release number that can be gracefully downgraded from.

Non-Graceful_Downgrade FROM <release number>
Denotes that downgrade from a specified release number is non-graceful but allowed. A non-graceful downgrade may cause some negative impact. There may be one or more of this instruction for each release number that can be non-gracefully downgraded from.

NoUpgrade FROM <release number>
Denotes that upgrade from a specified release number is NOT allowed. There may be one or more of this instruction for each release number that cannot be upgraded from.

NoDowngrade FROM <release number>
Denotes that downgrade from a specified release number is NOT allowed. There may be one or more of this instruction for each release number that cannot be downgraded from.

Requires <entry> FROM <entry_release1> [TO<entry_release2>]
Any miscellaneous requirements for a given component and given release number can be specified using this instruction. The <entry> may be backup boot, component type, hardware, etc.

End
Denotes end of the compatibility matrix definition for that specific block.

Using the above language constructs, compatibility information for each of the components capable of being installed in a system can be described. Each component is identified by the "FOR" and "END" pair of constructs. For example, to specify the compatibility information for the Cisco PMX45 control module, the compatibility information starts with "FOR PMX45". The end of the compatibility information for the PMX45 control module in this example is indicated by the "End" construct corresponding to the "FOR PMX45" construct.

FIG. 4 illustrates an example of a compatibility matrix in accordance with one embodiment of the present invention. The compatibility matrix in this example includes the compatibility information for the PMX45 control module. The compatibility information may be extracted from a compatibility map as described in FIG. 3. Referring to FIG. 4, the compatibility matrix indicates that, for the PMX45, the supported software releases or revisions include the following:

Release 2.0.10
Release 2.0.11
Release 2.0.12
Release 2.0.13
Release 2.1.0
Release 2.1.1.

The compatibility matrix also indicates that software for the PMX45 control module can be gracefully upgraded from the release or revision 2.0.13 to release 2.1.1. Similarly, a graceful upgrade occurs going from release 2.1.0 to release 2.1.1. On the other hand, a non-graceful upgrade can be performed going from release 2.0.10 to release 2.0.11. Furthermore, any attempt to upgrade from release 2.0.13 to release 2.1.0 is not allowed, etc. As described above, the compatibility matrix may include compatibility information for multiple components in a system. For example, the compatibility matrix in FIG. 4 may include compatibility information for the service modules associated with the PMX45 control module.

Although the compatibility information in the compatibility matrix illustrated in FIG. 4 is described as being based on the compatibility map, one may bypass the process of forming the compatibility map and instead use the migration information to generate the compatibility matrix directly. In one embodiment, instead of specifying no-upgrade migration paths, any migration paths not specified in the compatibility matrix is understood to be not allowed or not recommended.

Figure 5:
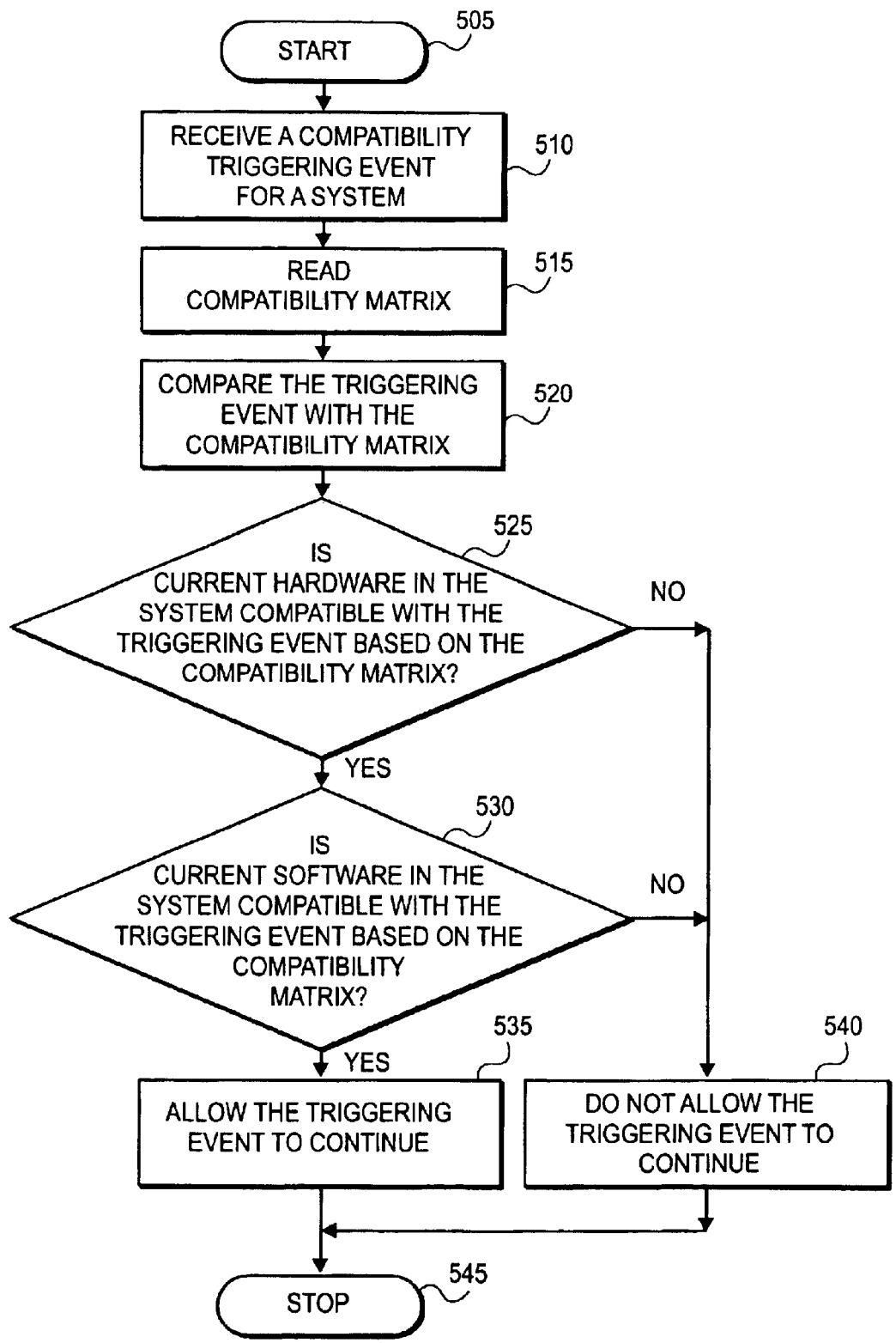
FIG. 5 is a flow diagram illustrating a process of compatibility verification using a compatibility matrix in accordance with one embodiment of the present invention.

FIG. 5 is a flow diagram illustrating a process of compatibility verification using a compatibility matrix in accordance with one embodiment of the present invention. The process starts at block 505. At block 510, a triggering event that may potentially cause incompatibility problem occurs. The triggering event may be a change to an existing hardware in a system. The triggering event may be an insertion of a new hardware into the system. In general, the triggering even may be any event that necessitates the system to perform a compatibility verification to ensure optimal performance.

At block 515, the compatibility information is read. As described earlier, the compatibility information may be stored in a compatibility matrix. The compatibility matrix has previously been generated and stored, for example, in a persistent memory, in the system. An instance of the compatibility matrix may be loaded into an area of a non-persistent memory (e.g., Random Access Memory (RAM)) and read by a system processor.

At block 520, the triggering event is compared with the compatibility matrix. This may include identifying the component that is related to the triggering event. For example, if the triggering event is an attempt to perform a software change to the PMX45 control module, then the identified component is the PMX45. Using the compatibility matrix, the compatibility information for the component PMX45 is accessed.

At block 525, a determination is performed to verify if the triggering event or the change to the component is hardware compatible with the current state of the other components in the system. For example, there may be a compatibility requirement that when the hardware of the control module is upgraded to a hardware revision "A", the hardware of the associated service modules also have to be at a revision equivalent to or compatible with the hardware revision "A". This compatibility requirement is provided in the compatibility matrix. From block 525, if incompatibility exists, the process flows to block 540 and the triggering event is rejected. This may include, for example, displaying a message indicating that the affected component is incompatible and not recommended.

From block 525, if there is hardware compatibility, the process flows to block 530 where a determination is performed to verify if the triggering event or the change to the component is software compatible with the other components in the system. For example, there may be a compatibility requirement that when the software of the control module is upgraded to a revision "B", the software of the associated service modules also have to be at a revision equivalent to or compatible with the software revision "B". This compatibility requirement is provided in the compatibility matrix. From block 530, if incompatibility exists, the process flows to block 540 and the triggering event is rejected. Alternatively, if there is software compatibility, the process flows to block 535 where the triggering event is accepted. This may include, for example, displaying a message indicating normal operation or change accepted. The process stops at block 545.

In one embodiment, in addition to performing compatibility verification in response to changes, the system may perform compatibility verification whenever a reset occurs. For example, a control module may perform compatibility verification on itself whenever it is reset. This may include, for example, loading an instance of the compatibility matrix into the RAM and confirming that its hardware revision is compatible with its associated software revisions. The control module may then verify compatibility with other associated service modules.

Using the compatibility matrix of the present invention, when a new release/revision (software, boot, hardware) for an existing component is announced or as a new component is announced, the compatibility matrix is updated and a new compatibility matrix file is distributed to systems at existing installations and/or at new installations. This compatibility matrix file is automatically read and interpreted by the system. When an upgrade or down grade of a component occurs, compatibility is quickly and automatically identified without required manual participation by an end user. Furthermore, because the compatibility verification is performed by the system, the risk of errors is greatly decreased.

Although the examples above refer to the control module and service modules in a communication switch, the compatibility matrix and the automatic compatibility verification methods of the present invention may also be applied to systems that have multiple components where compatibility of the components is desired to improve performance.

Figure 6:
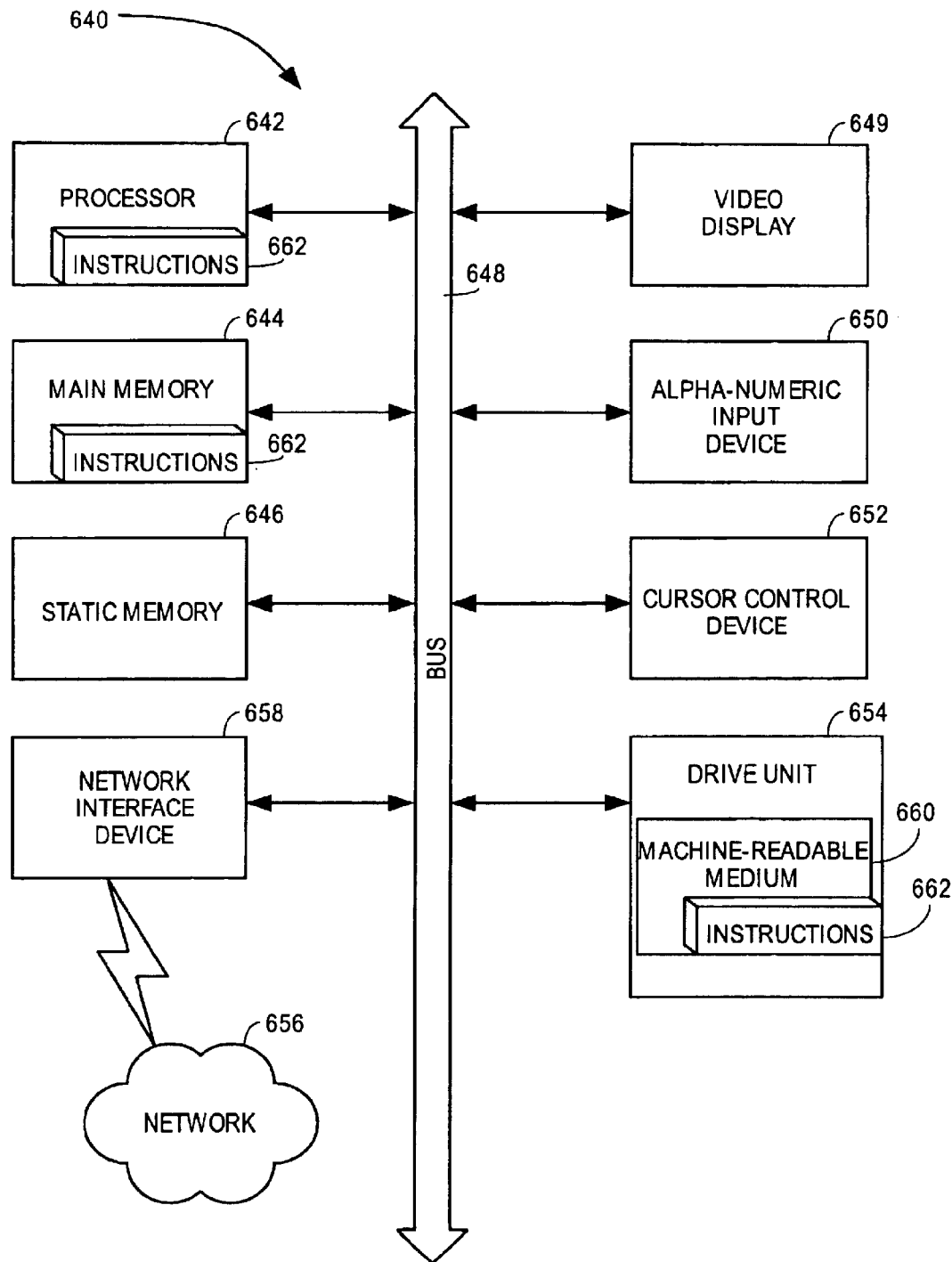
FIG. 6 is a block diagram illustrating a computer system in accordance to one embodiment of the invention.

FIG. 6 is a block diagram illustrating a computer system in accordance to one embodiment of the invention. The operations of the various methods of the present invention may be implemented in a digital processing system 640. The digital processing system 640 includes a bus 648 and a processor 642 coupled to the bus 648. The digital processing system 640 may also include a video display 649, an alpha-numeric input device 650, a cursor control device 652, etc., all coupled to the bus 648.

The digital processing system 640 also includes a main memory 644 such as random access memory (RAM) and a static memory 646. Both the main memory 644 and the static memory 646 are coupled to the bus 648. Although not shown, the digital processing system 640 may also include a read-only memory (ROM) and other storage devices coupled to the bus 648.

A storage device such as the drive unit 654 is provided for storing information used by the processor 642. The information may include a compatibility matrix in accordance with the present invention. The information may also include instructions 662 which are stored in a memory which may be considered to be a machine readable storage media 660. When the instructions 662 is loaded into the main memory 644 and executed by the processor 642, the instructions cause the processor 642 to perform operations according to the present invention. For example, the operations may include those described in FIG. 5.

The instructions 662 may be loaded into the main memory 644 from the drive unit 654 or from one or more other digital processing systems (e.g. a server computer system) over a network connection through network 656 using the network interface device 658. The instructions 662 may be stored concurrently in several storage devices (e.g. main memory 644, machine readable medium 660, etc.).

In other cases, the instructions 662 may not be performed directly or they may not be directly executable by the processor 642. Under these circumstances, the instructions 662 may be executed by causing the processor 642 to execute an interpreter that interprets the instructions 662, or by causing the processor 642 to execute instructions which convert the received instructions 662 to instructions which can be directly executed by the processor 642. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for performing compatibility verification, comprising:

creating a compatibility matrix for a plurality of components in a system the plurality of components including a control module, the compatibility matrix including compatibility information for each of the components in the system, the compatibility information including hardware revision information, software revision information, and migration information from a hardware revision to another hardware revision;

automatically performing a self-verification of the control module to determine if an associated hardware revision and one or more associated software revisions are compatible with one another based on the compatibility information of the control module;

when one of the components is modified, using the compatibility matrix to automatically determine if the modified component is a compatible component; and accepting the modified component as one of the components in the system when the modified component is determined to be a compatible component.

2. The method of claim 1, further comprising rejecting the modified component as one of the components in the system when the modified component is determined to be not a compatible component.

3. The method of claim 1, wherein a component is modified by migrating its associated hardware from one hardware revision to another hardware revision.

4. The method of claim 1, wherein a component is modified by migrating its associated software from one software revision to another software revision.

5. The method of claim 1, wherein the compatibility information includes migration information from a software revision to another software revision.

6. The method of claim 1, wherein the compatibility information includes graceful migration paths.

7. The method of claim 1, wherein the compatibility information further includes non-graceful migration paths, wherein a less than desirable performance by the system is experienced when a non-graceful migration path exists.

8. The method of claim 1, wherein the compatibility information further includes supported migration paths.

9. The method of claim 1, wherein the modified component is determined to be a compatible component when its hardware revision information is compatible with its software revision information.

10. The method of claim 1, wherein the modified component is determined to be a compatible component when a migration from one hardware revision to another hardware revision is graceful or non-graceful.

11. The method of claim 1, wherein the modified component is determined to be a compatible component when a migration from one software revision to another software revision is graceful or non-graceful.

12. The method of claim 1, wherein the modified component is determined to be a compatible component when it is compatible with the other components in the system.

13. The method of claim 1, wherein using the compatibility matrix to automatically determine if the modified component is a compatible component comprises:

determining a first state of the modified component before the component is modified;

determining a second state of the modified component after the component is modified;

locating compatibility information of the modified component in the compatibility matrix; and determining if the compatibility information of the modified component supports a migration path from a pre-modification state to a post-modification state.

14. The method of claim 13, further comprising accessing an instance of the compatibility matrix in a non-persistent memory in order to locate the compatibility information of the modified component.

15. A communication system, comprising:

a control module configured to automatically perform self-verification to determine if its associated hardware revision and one or more associated software revisions are compatible with one another based on compatibility information for the control module provided in a predetermined compatibility matrix, wherein after the control module successfully performs the self-verification, the control module automatically verifies each of one or more related service modules, based on compatibility information for the service modules provided in the predetermined compatibility matrix, to determine if the control module is compatible with the one or more related service modules based on the compatibility information for the control module, wherein the compatibility information for the control module and the compatibility information for the service module include allowed migration paths and non-allowed migration paths.

16. The communication system of claim 15, wherein the control module verifies hardware revisions and software revisions of each of the one or more related service modules.

17. A computer readable medium having stored thereon sequences of instructions which are executable by a system, and which, when executed by the system, cause the system to:

form a compatibility matrix that includes compatibility information for a plurality of components being installed in a system the plurality of components including a control module, the compatibility information including information about supported hardware revisions, supported software revisions for each of the plurality of components, and graceful migration paths and non-graceful migration paths from a supported hardware revision to another supported hardware revision and from a supported software revision to another supported software revision;

automatically performing a self-verification of the control module to determine if an associated hardware revision and one or more associated software revisions are compatible with one another based on the compatibility information of the control module; and responsive to a change to the system affecting at least one of the components, automatically determining whether to accept or reject the change based on the compatibility matrix.

18. The computer readable medium of claim 17, wherein a new version of the compatibility matrix is formed when a new supported component is introduced.

\* \* \* \* \*